C. B. & G. S. DOTY.
TIRE.
APPLICATION FILED AUG. 2, 1912.
1,122,875.
Patented Dec. 29, 1914.
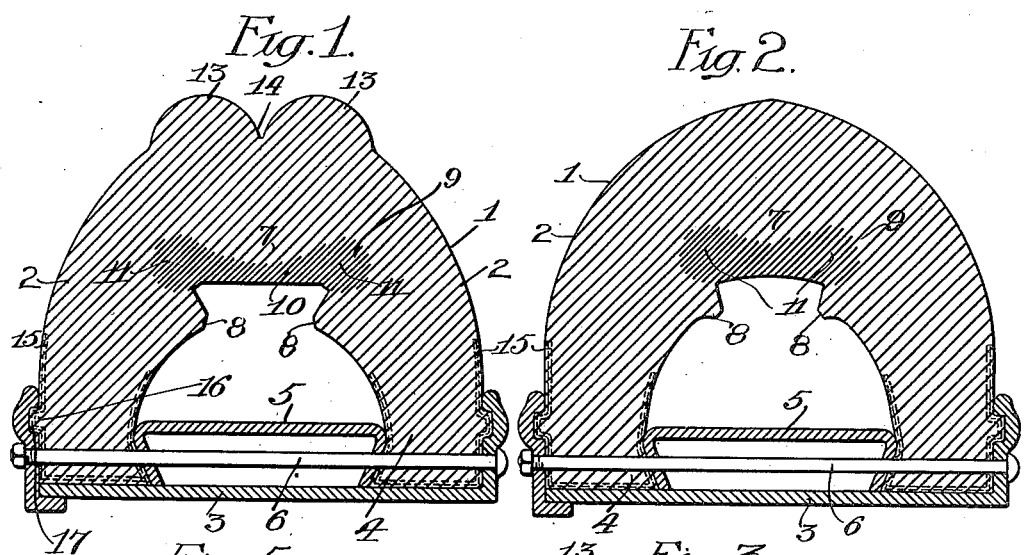
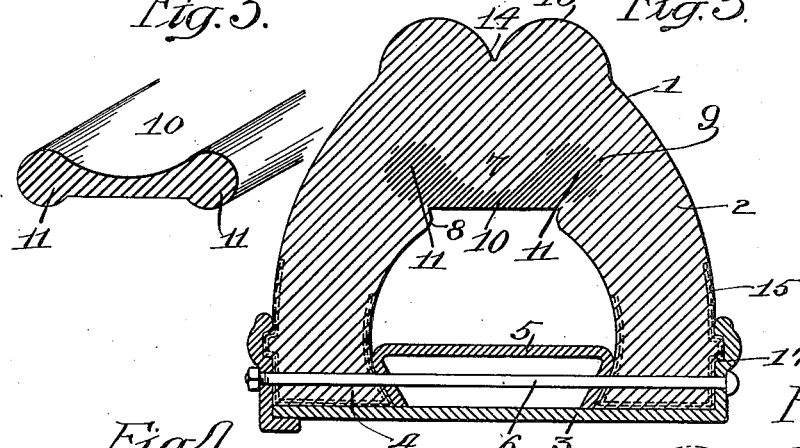
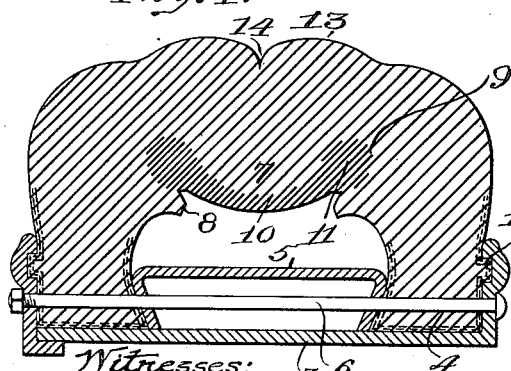
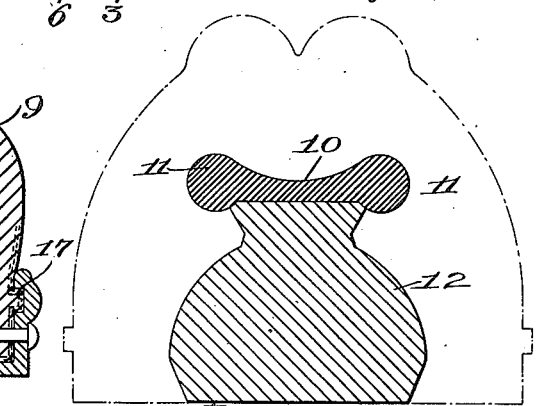
Witnesses:
William F. Rivoir
Walter F. Pullinger
Inventors:
Cecelia B. Doty & Giles S. Doty
by their Attorneys.
Howson & Howson

UNITED STATES PATENT OFFICE.

CECELIA B. DOTY AND GILES S. DOTY, OF PHILADELPHIA, PENNSYLVANIA.

TIRE.

1,122,875.                 Specification of Letters Patent.     Patented Dec. 29, 1914.

Application filed August 2, 1912.   Serial No. 712,955.

*To all whom it may concern:*

Be it known that we, CECELIA B. DOTY and GILES S. DOTY, both citizens of the United States and residents of Philadelphia, Pennsylvania, have invented certain Improvements in Tires, of which the following is a specification.

Our invention relates to tires for automobiles and similar vehicles, and consists of an improved form of cushion tire designed to overcome the defects heretofore present in tires generally and particularly tires of this character; the object of our invention being to provide a tire having substantially the same resiliency as an ordinary pneumatic tire without the objectionable features possessed by the latter, such as liability of puncture and danger of explosion.

An important feature of the tire forming the subject of our invention is the inclusion therewith of a section of substantially pure gum rubber within the body of the tire; such section being vulcanized or cured with and forming a substantially homogenous part of the finished tire.

These and other features of our invention will be more fully referred to hereinafter, reference being had to the accompanying drawings, in which:

Figure 1, is a cross sectional view of one form of tire embodying our invention; Figs. 2 and 3, are similar sectional views of other forms of tires embodying our invention; Fig. 4, is a view of the tire shown in Fig. 1, illustrating the compression of the same in use; Fig. 5, is a perspective view of the resilient insert, and Fig. 6, is a view illustrating the manner in which our improved tire is built up on a core.

Our improved tire is, in general outline, of the usual horseshoe-shape common to tires, and in the present instance, the body of the tire, indicated generally at 1, has walls 2 for engagement with a rim 3 which may be of ordinary construction; such walls being widened at their point of connection with the rim, as indicated at 4, for engagement by a substantially wedge-shaped member 5, connected with the rim by bolts 6.

The tread portion of the tire body is provided internally with a circumferential rib 7, substantially semi-circular in cross section, and the walls 2 have ribs 8 integral therewith extending circumferentially of the tire and projecting inwardly toward each other. Formed between these ribs 8 and the circumferential rib 7 on each side of the interior of the tire chamber and adjacent the tread are circumferential pockets 9 having a generally rounded contour and substantially or nearly circular in cross section. Adapted to fill these pockets and stretching across the tire chamber, and extending circumferentially of the same, is a section 10 of substantially pure gum rubber having a high degree of resiliency which, in addition to the tendency to be normally retained by the pockets 9 formed in the tire body, is vulcanized or cured with the rest of the material forming the tire so as to be in the finished structure a substantially homogeneous body. This section 10 is shaped to closely engage the rib 7 and is provided with enlarged side ribs or formations 11 to substantially fill the pockets 9.

The section may be molded by any usual or well known means to substantially the shape indicated. It is then placed on the building core 12, as indicated in Fig. 6 then the shell or body of the tire structure proper, previously molded in any suitable manner is built around such core and the resilient insert 10, and then the two bodies of rubber material are connected into a homogeneous body by the proper application of heat so that the shell or body 1 and the insert 10, for all practical purposes and uses, form one body. In such structure, however, the shell or body is comparatively or relatively solid and wear-resisting and only slightly elastic, while the substantially pure gum insert retains its original elasticity.

The tread of the tire may be formed with circumferential ribs 13, semi-circular in contour, with a circumferential recess or depression 14 between the same, as indicated in Figs. 1 and 3, which construction, in use, will tend to form a pocket and afford a suction grip preventing skidding. The double tread comprising the parallel circumferential ribs 13 are substantially in line with the enlarged or thickened edges of the highly resilient insert of rubber material 10, and when said ribs are compressed they react on said thickened edges of the insert and stretch the web of the same as indicated in Fig. 4. This stretching of the insert effected by the external ribs increases the resiliency of the tire, while the elasticity of the insert insures the contraction of the walls of the tire to their normal position when the pressure tending to stretch or flatten the ribs is relieved.

In use, the tire will be depressed under the weight of the load, as indicated in Fig. 4, and such depression will tend to throw the side walls of the tire body outward, stretching the section of rubber gum 10 and causing the internal ribs to be bent toward the rim. The section of rubber gum 10 laterally, however, prevents collapse of the tire when pressure is applied, and upon the pressure being relieved from the tire during its constant rotation, said section by its power of contraction acts constantly to restore the body of the tire to its normal shape and position. The lines of pressure pass substantially through the center of the ribs 13 of the tread and the center of the enlarged side portions 11 of the resilient insert of gum rubber 10 disposed in the pockets 9 of the tire body. It may be further noted that the construction of the tire is such that while under compression the side walls are pressed outwardly by movement of the tread of the tire toward the rim, a part of the compression is taken up by the resilient core or insert of gum rubber 10; such action taking place without chafing or undue friction. The side walls of the tire at the points adjacent their connection with the rim are preferably covered or incased with the usual friction cloth, canvas or the like, employed for such purpose and indicated at 15, and by preference the side walls are provided with ribs 16 around which such canvas or friction cloth is molded, as clearly indicated in the drawings, while the flanges of the rim portion are grooved at 17 to receive said ribs. This construction not only affords ample and proper retaining means between the tire and rim, but in addition it affords protection against the passage of water to the rim.

We claim:

1. A tire comprising a body of rubber material substantially horseshoe-shaped in contour having side walls and a tread portion integral therewith and formed with a circumferential rib with circumferential recesses adjacent said rib, and a core or insert of highly elastic rubber material connected to said body adjacent the tread portion, said highly elastic body of rubber material bridging the tire cavity and filling the circumferential recesses, said bodies being vulcanized or cured together in a single homogeneous mass.

2. A tire comprising a body of rubber material substantially horseshoe-shaped in contour having side walls and a tread portion integral therewith and formed with a plurality of internal circumferential recesses, and a core or insert of highly elastic rubber material substantially dumb-bell-shape in cross section connected to said body adjacent the tread portion, said highly elastic body of rubber material bridging the tire cavity and filling the circumferential recesses, and said bodies being vulcanized or curved in a single homogeneous mass.

3. A tire comprising a mass of rubber material substantially horseshoe-shaped in contour having side walls and a tread portion integral therewith having a pair of parallel external ribs circumferentially disposed, said ribs being substantially semi-circular in cross section and providing a circumferential groove between the same, with a pair of internal ribs circumferentially disposed between which and the inner wall of the tire substantially semi-circular circumferential recesses are formed, and a core of highly resilient rubber material disposed within the body of the tire, said core having thickened edges fitting said recesses and homogeneously united to said body with the thickened edges substantially in line with the external parallel ribs; said core or insert forming part of the wall of the tire cavity.

4. A tire comprising a body of rubber material substantially horseshoe-shaped in cross section, said tire having an internally disposed semi-circular rib circumferentially disposed, an inner core of highly resilient material, said core having edge ribs disposed in pockets formed in said tire body adjacent the rib of the body and being concaved between its ribs for the reception of the rib portion of said body in line with the tread, said resilient insert forming a support for the rounded portion of the tread and connecting the side walls of the same when the tire is in action.

5. A tire comprising a body of rubber material substantially horseshoe-shaped in cross section having side walls and a tread portion integral therewith, and a core or insert of highly elastic material substantially dumb-bell-shaped in cross section homogeneously connected to said tire body adjacent the tread portion, said core or insert forming part of the wall of the tire cavity and forming a support for the tread portion of the tire body and connecting the side walls of the same when the tire is in action.

In testimony whereof, we have signed our names to this specification, in the presence of two subscribing witnesses.

CECELIA B. DOTY.
GILES S. DOTY.

Witnesses:
MURRAY C. BOYER,
WM. A. BARR.